(No Model.)

F. H. RICHARDS.
WEIGHING MACHINE.

No. 600,024. Patented Mar. 1, 1898.

Witnesses
J. L. Edwards Jr.
Heath Sutherland

Inventor
F. H. Richards (No Model.)  F. H. RICHARDS.  5 Sheets—Sheet 2.
WEIGHING MACHINE.

No. 600,024.  Patented Mar. 1, 1898.

Witnesses
J. L. Edwards Jr.
Heath Sutherland

Inventor
F. H. Richards (No Model.)
5 Sheets—Sheet 3.

F. H. RICHARDS.
WEIGHING MACHINE.

No. 600,024. Patented Mar. 1, 1898.

Witnesses
J. C. Edwards Jr.
Heath Sutherland

Inventor
F. H. Richards (No Model.) 5 Sheets—Sheet 4.

F. H. RICHARDS.
WEIGHING MACHINE.

No. 600,024. Patented Mar. 1, 1898.

Witnesses
J. C. Edwards Jr.
Heath Sutherland

Inventor
F. H. Richards (No Model.)  5 Sheets—Sheet 5.

F. H. RICHARDS.
WEIGHING MACHINE.

No. 600,024.  Patented Mar. 1, 1898.

Witnesses;
O. W. Smith
Heath Sutherland

Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 600,024, dated March 1, 1898.

Application filed May 29, 1897. Serial No. 638,669. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide an improved apparatus of this character especially intended for weighing liquids, it being particularly adapted for use in weighing the feed-water of steam-boilers, the load-receiver of the weighing mechanism being preferably dischargeable into a feed-water tank, so that an accurate registration of the amount of water supplied to the boiler can be obtained to aid in making efficiency tests of the latter.

Figure 1:
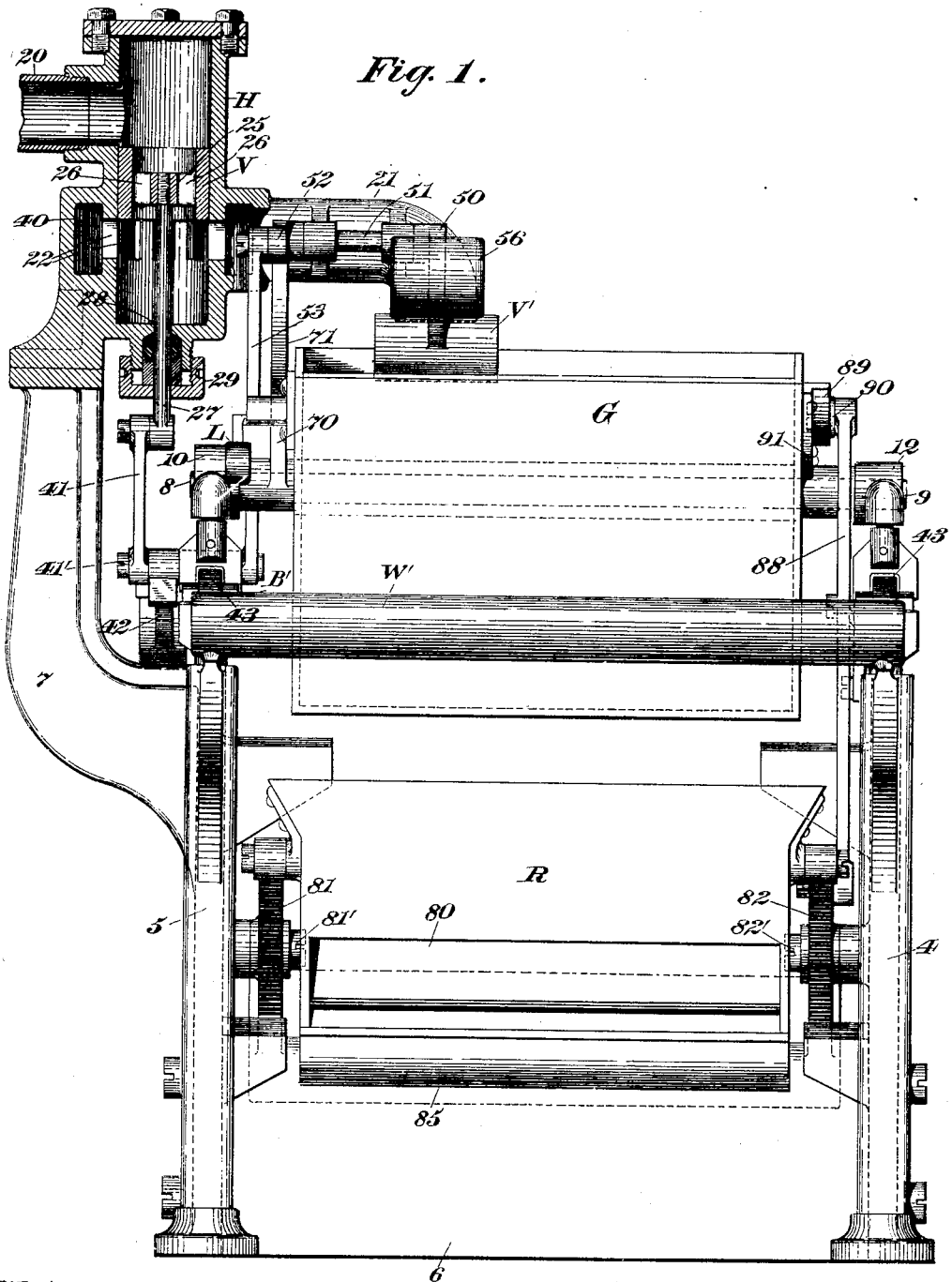
Figure 2:
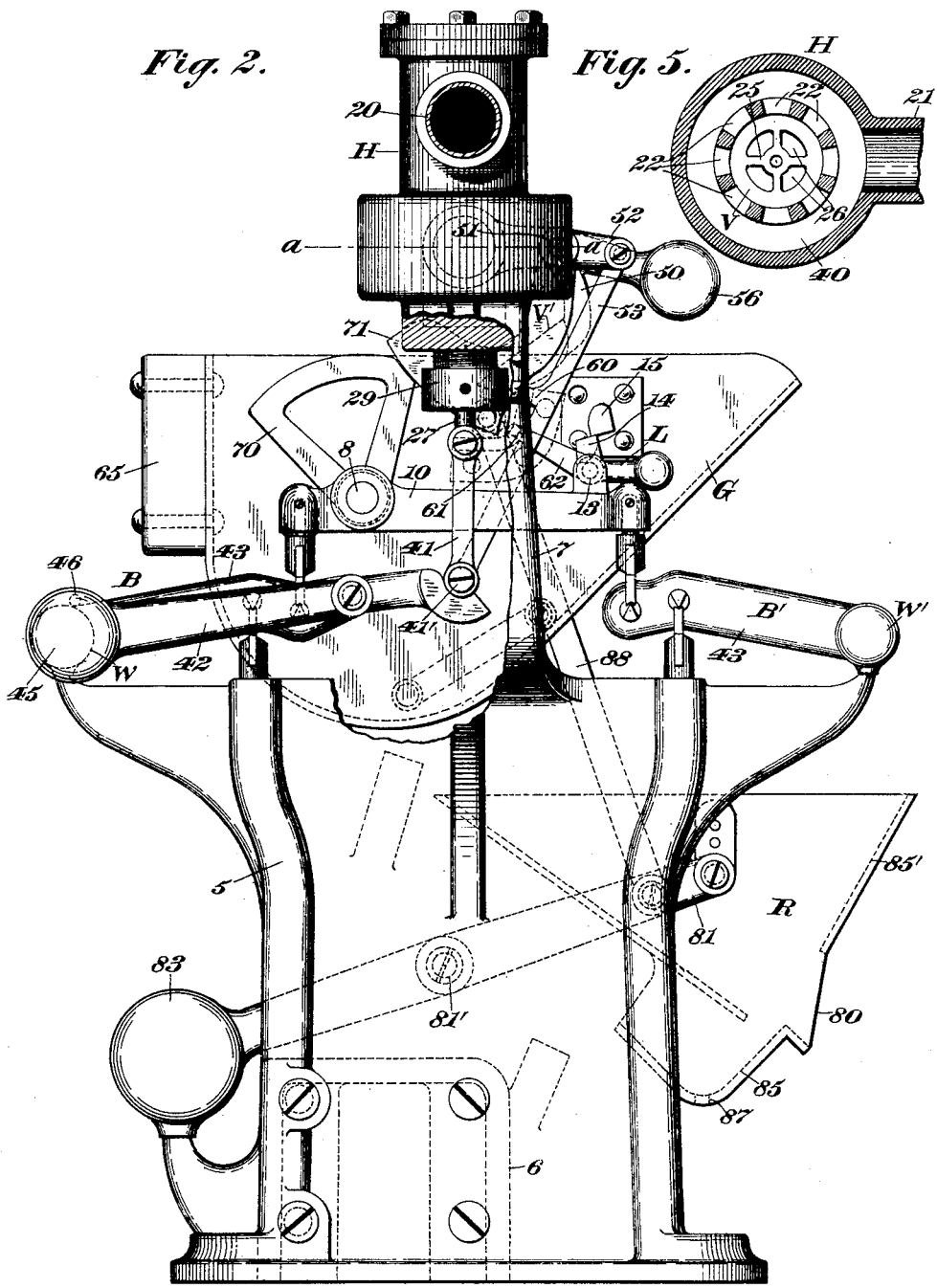
Figure 3:
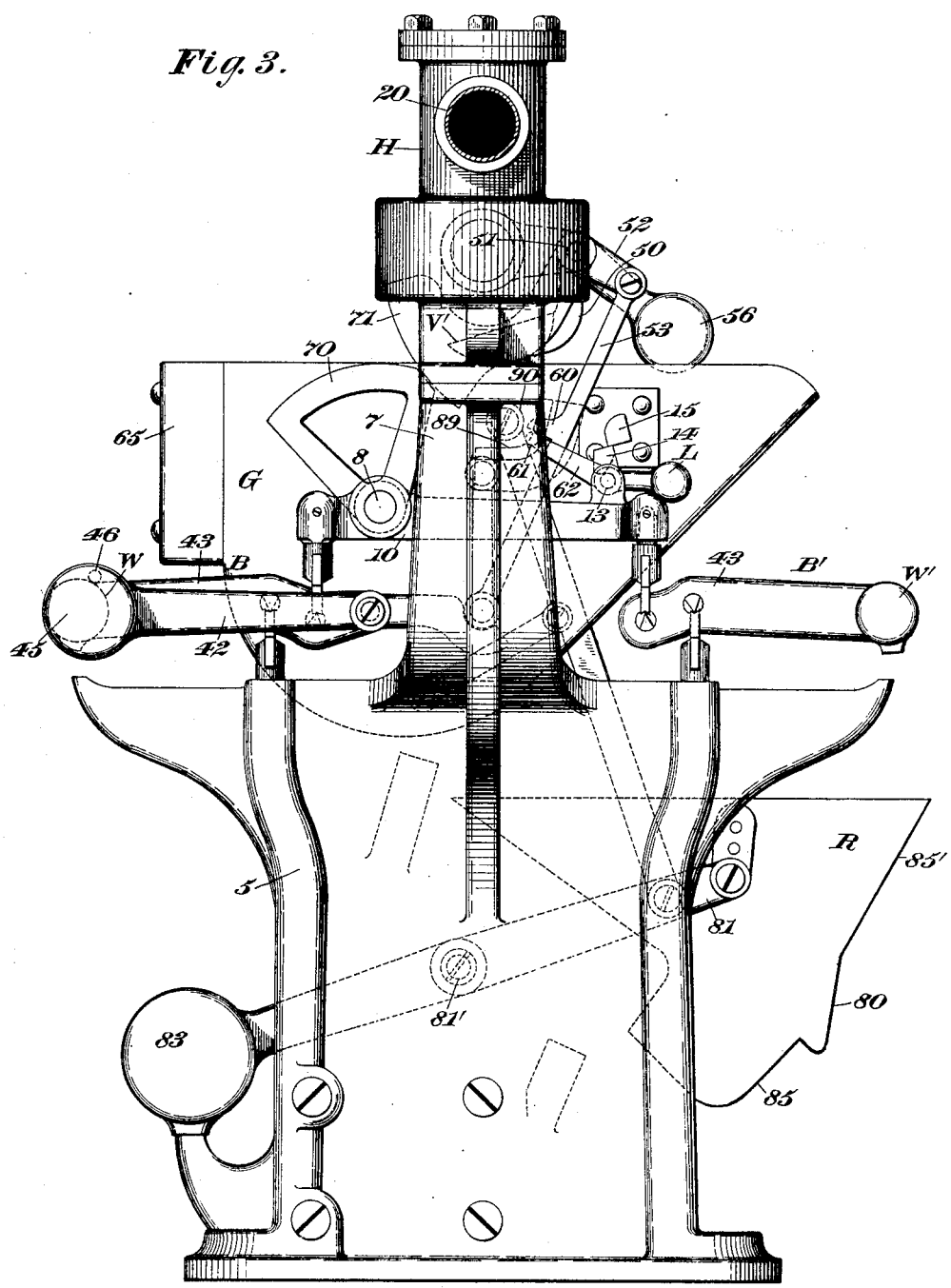
Figure 4:
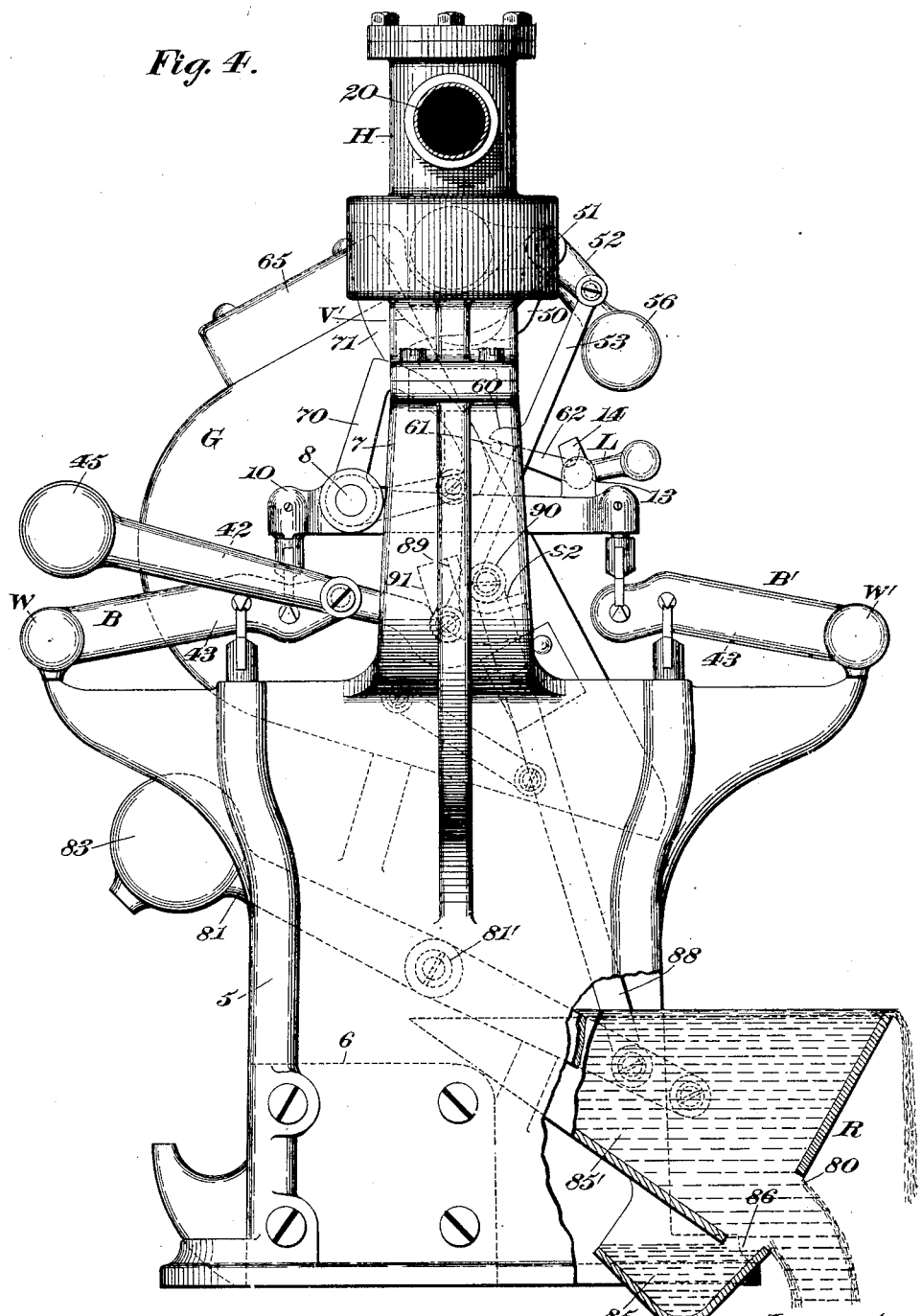
Figure 6:
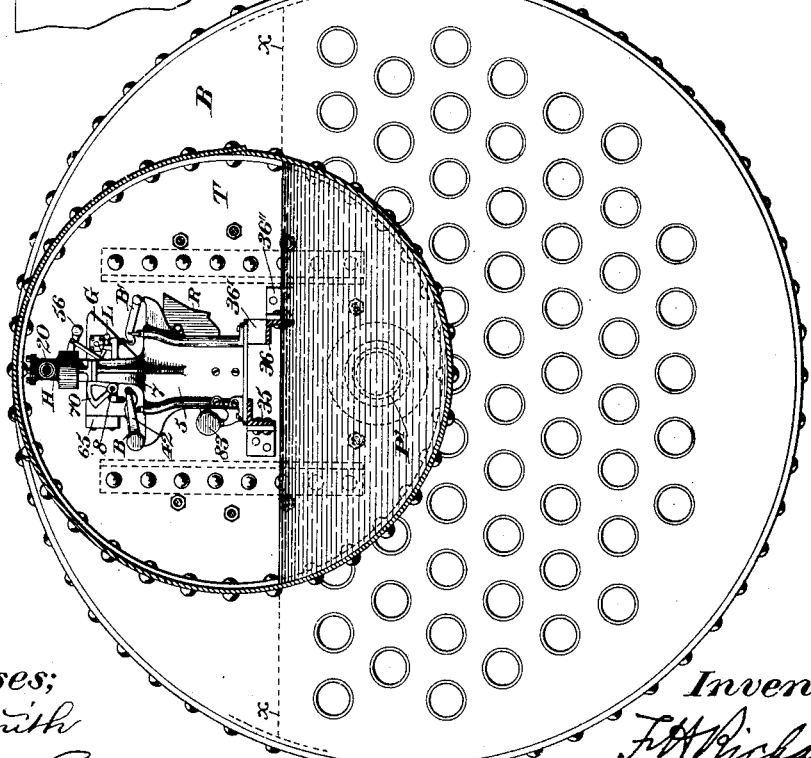

In the drawings accompanying and forming part of this specification, Figure 1 is a front elevation of my improved weighing-machine. Figs. 2, 3, and 4 are side elevations of the machine as seen from the left in Fig. 1. Fig. 5 is a sectional bottom view taken in the line *a a*, Fig. 2. Fig. 6 is an end elevation of a boiler, showing the weighing-machine incased in the feed-water tank; and Fig. 7 is a side elevation of one end of the boiler, the feed-water tank and pipes communicating with the boiler being in longitudinal central section.

Similar characters designate like parts in all the figures of the drawings.

My improved weighing-machine is especially intended for weighing liquids, it being represented in the accompanying drawings as employed in connection with a steam-boiler, the load-receiver constituting a part of the weighing mechanism being dischargeable into the feed-water tank, a valve controlled by the weighing mechanism being preferably provided to govern the supply thereto.

Figure 7:
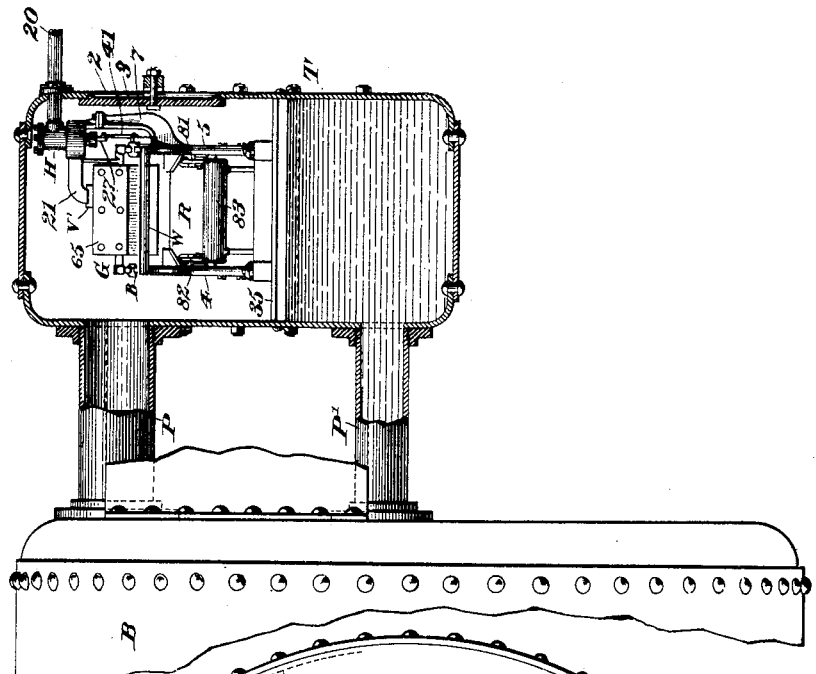

The weighing mechanism, which may be of any convenient form, is preferably housed or inclosed in the feed-water tank T and is preferably situated above the normal water-level in the boiler B, (indicated by the dotted line *x x*, Fig. 6,) the tank T communicating with the boiler by the pipes P and P' in a well-known manner, and the pipe P' serving to conduct the feed-water from the tank to the boiler, as shown in Figs. 6 and 7.

The tank T has at a suitable point therein the manhole 2 to provide access to the interior of the tank, which is closed by the cover 3, normally maintained in such position by suitable means.

The framework for sustaining the various parts of the weighing mechanism may be of any preferred character, it comprising in the present case the side frames 4 and 5, connected near their lower ends by the beam 6 and the riser 7, secured to the side frame 5 in some convenient manner.

The support for the weighing mechanism consists in the present case of the brackets 35 and 36, transversely disposed about midway of the tank and secured in some suitable manner respectively to the opposite ends thereof, the side frames 4 and 5 being bolted or otherwise secured to the bracket 35 and to blocks 36' and 36'' on the bracket 36.

The weighing mechanism in the present case comprehends a load-receiver consisting of a tilting bucket G and a plurality of scale-beams for supporting the same, the scale-beams being designated by B and B' and being mounted upon the side frames 4 and 5 in the usual manner.

The load-receiver G is furnished with the projecting trunnions or pivots 8 and 9 at opposite sides thereof, journaled in suitable bearings in the end bars 10 and 12, the latter being provided at the opposite ends thereof with the usual notched bearings resting on knife-edge pivots suitably secured to the poising ends of the two beams.

The load-receiver G is maintained in its normal position (indicated in Fig. 2) by a suitable detent, such as the latch L, the latter consisting of a comparatively short counterweighted lever, pivoted at 13 to the bar 10 and having the projection or boss 14, adapted to engage the coöperating stud 15, suitably fixed to the load-receiver, the engaging faces of these two parts being oblique, as represented in Fig. 2. The center of gravity of the loaded bucket G is situated forward of the center of movement thereof, so that when the latch is tripped said bucket, by reason of the preponderance of weight forward of its axis of oscillation, will be caused to tilt to discharge its contents.

The standard or riser 7 constitutes a suitable means for supporting the supply apparatus, which in the present case includes the supply-chamber H, in which is inclosed a supply controller or valve, as V, said valve-chamber being represented as a vertically-disposed cylinder suitably mounted on the standard 7, while the valve V is of tubular form.

The supply-chamber intersects a supply-pipe leading toward the weighing mechanism, said supply-pipe consisting of two sections 20 and 21 in screw-threaded engagement with the chamber or cylinder above and below its center, the pipe 21 forming practically a spout and it being located over the load-receiver G to conduct the water thereto from the chamber H. The supply-chamber H at a suitable point therein has a series of ports 22, which are covered and uncovered alternately by the valve V on its descending and ascending strokes, said valve being preferably connected with the weighing mechanism for operation.

The valve V, which is of the "piston" type, has on the inside thereof at a point intermediate its ends the web 25, in which are formed a series of ports 26, the stem 27 of the valve being suitably secured to said web 25, it being represented as screw-threaded therein and as extending through an aperture 28 in the lower end of the chamber H. The valve-stem 27 also passes through the stuffing-box 29, of ordinary construction, which can be suitably secured to the chamber H.

Fig. 1 represents the valve V in its highest or normal position, so that when a body of water is flowing into the chamber H from the pipe 20 it will pass through the series of ports 26 of the valve and from thence through the ports 22 of the chamber H and into the communicating pipe-section 21, from whence it flows into the load-receiver. When a certain quantity of material has been received by the load-receiver G, it will descend thereby through suitable instrumentalities, drawing the valve V downward across the ports 22 to progressively reduce and subsequently cut off the supply to the load-receiver G, this operation being completed when the receiver G is loaded. The fluid on leaving the peripherally-formed ports of the valve-chamber H will pass into the annular compartment 40, surrounding said chamber, and from thence into the pipe 21.

The piston-valve V, as hereinbefore specified, is connected with the weighing mechanism for operation, the lower end of the valve-stem 27 being shown pivoted to the link 41, the link being pivoted at 41' to the controlling device or actuator 42.

The controlling device or actuator 42 consists in the present case of a counterweighted lever carried by the beam B for shifting movement, it being adapted on the reciprocation of the load-receiver to operate the valve V. The two beams are of common construction, each consisting of a pair of arms, as 43, joined at the rear by a counterweight, the two counterweights being designated, respectively, by W and W'. The counterweighted lever 42 is pivoted at the poising end of the inner arm of the scale-beam B, the weight 45 of said lever being furnished with a laterally-extending pin 46, normally resting on the adjacent beam-weight W, whereby as the load-receiver descends the inner end of the counterweighted lever will move in a corresponding direction, so as to draw the valve V downward by reason of the intermediate connections to effect the cut-off of the supply when the load is completed. The return movement of the lever 42 with the beam B on the discharge of a load will be intercepted, as will hereinafter appear, by a suitable stop mechanism.

For the purpose of obtaining greater accuracy I provide, in addition to the piston-valve, an independently-operated valve, such as V', and which is preferably operated during the weighing of a load to carry it under the outlet of the pipe 21, whereby on the cut off of the supply by the valve V the valve V' is adapted to catch any drizzle or excess that may be in the pipe at a point between the piston-valve and the delivery end of the pipe.

The valve V' is of the pan type, it having at the one side thereof the arm 50, suitably affixed to the rock-shaft 51, working in suitable bearings on one side of the spout or pipe 21. The action of the valve V' is also preferably controlled by the weighing mechanism, the shaft 51 having at one end thereof the crank-arm 52, to which is pivoted the connector or rod 53, connected at its opposite end to the pivot 41' of the actuator 42.

The means shown for advancing the valve V' or swinging it under the outlet of the pipe or spout 21 consists of the weight 56, secured to the valve-arm 50 and which tends normally to effect the operation specified, the too-rapid movement of the valve V' being prevented, as will be understood, by the lever 42, with which the rod 53 is connected. When the lever 42 resumes its normal position, the rod 53 will be thrust upward to swing the valve V' from under the outlet of the spout or pipe 21, so that any material in the valve V' can pass into the load-receiver G.

It will be remembered that a latch L has hereinbefore been described for controlling the discharge of a load, said latch being adapted to hold the load-receiver in its normal position. The tripper for the latch consists in the present case of the projection 60 at a suitable point on the rod 53, the said tripper being adapted to impinge against the pin 61 on the forward arm of the latch 62 when the load is completed, so that the projections 14 and 15 will be disengaged to permit the load-receiver G to tilt. The load-receiver can be returned to its normal position by the weight 65, of suitable efficiency, secured to the rear wall thereof by some convenient fastening means.

In connection with the weighing mechanism and the valve reciprocally-effective stops are provided for preventing the discharge of a load until the supply is cut off and for preventing the opening of either of the valves until the load-receiver has resumed its primary position. Said stops are designated, respectively, by 70 and 71, and they are substantially segmental in shape, the stop 71 being secured to the rock-shaft 51, while the stop 70 is affixed to the trunnion 8. The operation of the two stops is clearly illustrated in Figs. 2 and 4. In Fig. 2 the stop 70 is shown in contact with the curved face of the coöperating stop 71, so that should the latch L be tripped too soon the load-receiver G cannot tilt, for the reason that the stop 71 will block the action of the stop 70, which is operative with said load-receiver, this relation continuing until the supply is cut off, at which time the stop 71 will have crossed the plane of oscillation of the stop 70, so that when the latch L is tripped, or it having been previously tripped, the load-receiver G can tilt downward, and as it does so the curved face of the stop 70 will ride along the adjacent portion of the coöperating stop 71, as shown in Fig. 3, thereby to prevent the retraction of the stop 71 and the valves V and V'. It will be understood also that when the stop 70 is in position to block the action of the coöperating stop the lever 42 will be held in its shifted position, (indicated in Fig. 4,) although the load-receiver and beam mechanism are free to return to their uppermost positions. When the load-receiver G has been righted, the stop 70 will release its companion, so that the valves V and V' can be opened by the dropping of the counterweighted lever 42.

In connection with the weighing mechanism I provide a regulator in position to receive and to be lowered by the loads of material intermittingly discharged from the load-receiver, blocking means operative with said load-receiver being provided to hold the latter in its shifted or tilted position for a sufficient length of time to insure the discharge of the entire load. The regulator consists in the present case of a hopper R, supported for reciprocation beneath the load-receiver and counterweighted, the outlet of the regulator hopper or receptacle being designated by 80.

The regulator R is carried by the longitudinal levers 81 and 82, respectively, pivoted at 81' and 82' to the side frames 4 and 5, the two arms being pivoted to opposite sides of the receptacle R and connected at the rear by the cylindrical weight 83, constituting a means for returning said regulator to its initial position (shown in Fig. 2) when a certain quantity of the fluid has passed therefrom.

The regulator R has on the under side thereof the pocket 85, communicating with the main chamber 85' thereof by an opening 86, so that the water or other liquid from the regulator can flow into the pocket 85 to fill the same. On the discharge of a load from the receiver G the fluid will enter the regulator R and will fill the same, the outlet 80 being of reduced size to insure this result, a certain quantity of the fluid passing into the pocket 85 through the opening 86, whereby the regulator can be held in its lowermost position (shown in Fig. 4) for a comparatively long period of time, so that through the intervention of suitable means it is adapted to hold the load-receiver G in its tilted position. The pocket 85 has the outlet 87, of reduced size, through which the fluid can pass.

The regulator R is preferably suspended between the forward arms of the two levers 81 and 82, constituting a carrier therefor, and its center of gravity is situated below its axis, whereby the regulator cannot be tilted when a load from the receiver G is discharged thereinto, it being maintained in a substantially level or horizontal position by reason of such mounting, so that it can be filled promptly and lowered for carrying out a certain object hereinafter set forth.

The regulator has connected therewith a holding device, such as the rod 88, pivoted to the arm or lever 82 in the forward end thereof, said rod being adapted to coöperate with a suitable device on the load-receiver, as the projection 89, and having a projection 90 in the form of an antifriction-roll adapted to coöperate therewith. The projection 89 is in the form of a flange on the bracket 91, suitably secured to the load-receiver, the roll 90 being adapted to coöperate with the concave working face of the projection.

It will be observed that the projection 89 is located forward of the axis of oscillation of the load-receiver and that the projection or roll 90 is normally in contact with the concave face 92 thereof. When the load-receiver tilts and discharges its contents, the projection 89 will fall away from the coöperating projection 90, the material being discharged into the regulator R to fill the same and to cause its depression. When the regulator R is lowered, the rod 88 will be drawn downward, carrying the projection 90 into contact with the coöperating projection 89, thereby to hold the load-receiver in its tilted position (illustrated in Fig. 4) so long as the regulator R is down. When a certain quantity of material has passed from the regulator, it will rise, thereby releasing the load-receiver G, so that it can be righted by the weight 65.

The operation of the hereinbefore-described machine, briefly set forth, is as follows: The parts are shown in their primary positions in Figs. 1 and 2, wherein the valve V is situated above the ports 22 and the valve V' is wide open, so that a full volume of the supply can pass through the pipe 20, chamber H, and pipe 21, and from thence into the load-receiver G. When a certain proportion of the load has been received by the receiver G, it and the beam mechanism will descend and the one end of the actuator or lever 42, moving therewith and drawing the link 41 downward, the valve V will be closed or moved across the ports 22 to stop the flow of the fluid to the load-receiver, the valve V', by reason of its connection with the actuator 42, being simultaneously swung under the pipe 21, the supply to the load-receiver being completely cut off by the valves V and V', when the load is completed. On the completion of the load the tripper 60 will impinge against the pin 61 on the latch-arm 62, thereby depressing said arm and disengaging the coöperating projections 14 and 15, so that the bucket G can be tilted by the material therein. When the bucket tilts, its contents will be discharged into the regulator R, thereby lowering the same and carrying the projection 90 into contact with the corresponding projection 89 to hold the bucket in its tilted position until the entire load has been discharged therefrom. When a certain quantity of material has been discharged from the regulator, the same will rise, thereby permitting the bucket to be righted by the counterweight 65, following which the several parts of the machine will be returned to their primary positions to repeat the operation.

Having described my invention, I claim—

1. The combination, with weighing mechanism including a tilting load-receiver provided with a projection, of a regulator-hopper supported independently of the weighing mechanism and in position to receive and to be shifted by the loads intermittingly discharged by said load-receiver; and a device connected with the regulator and adapted to engage the projection on the load-receiver when the latter and the regulator are shifted, said device serving positively to hold the load-receiver in its discharging position.

2. The combination, with weighing mechanism including a tilting load-receiver provided with a projection, of a regulator-hopper supported independently of the weighing mechanism and in position to receive and to be shifted by the loads intermittingly discharged by said load-receiver, said regulator having a pocket communicating therewith and into which a portion of the load discharged can enter to retard the return movement of the regulator; and a device connected with said regulator and adapted to engage the projection on the load-receiver when the latter and the regulator are shifted, said device serving positively to hold the load-receiver in its shifted position.

3. The combination, with weighing mechanism including a tilting load-receiver provided with a projection, of a regulator-hopper supported independently of the weighing mechanism and in position to receive and to be shifted by the loads intermittingly discharged by said load-receiver; a counterweighted carrier for the regulator; and a rod connected with the carrier and having a projection operable to engage the projection on the load-receiver when the latter and the regulator are shifted, whereby said load-receiver is positively held in its discharging position.

4. The combination, with weighing mechanism including a load-receiver provided with a projection, of a regulator-hopper supported independently of the weighing mechanism and in position to receive and to be shifted by the loads intermittingly discharged by said load-receiver; a device connected with the regulator and adapted to engage the projection on the load-receiver when the latter and the regulator are shifted, said device serving positively to hold the load-receiver in its discharging position; valve mechanism; and means upon the load-receiver for blocking the action of the valve mechanism.

5. The combination, with weighing mechanism including a load-receiver, of a valve-chamber; pipes leading to and from the chamber, the pipe leading from the chamber being located over the load-receiver; a reciprocatory valve situated in the valve-chamber and connected with the weighing mechanism for operation; a valve adapted to be swung beneath the outlet of the last-mentioned pipe; a shaft for carrying said last-mentioned valve; a crank on the shaft, connected with the weighing mechanism; and reciprocally-effective stops connected, respectively, with the shaft and the load-receiver.

FRANCIS H. RICHARDS.

Witnesses:
F. N. CHASE,
ANDREW FERGUSON.